(12) United States Patent
Sun et al.

(10) Patent No.: US 10,924,750 B2
(45) Date of Patent: Feb. 16, 2021

(54) PALETTE SIZE CONSTRAINT IN PALETTE MODE FOR VIDEO COMPRESSION SYSTEM

(71) Applicant: Alibaba Group Holding Limited, Grand Cayman (KY)

(72) Inventors: Yu-Chen Sun, Bellevue, WA (US); Jian Lou, Bellevue, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 14 days.

(21) Appl. No.: 16/290,255

(22) Filed: Mar. 1, 2019

(65) Prior Publication Data

US 2020/0280729 A1    Sep. 3, 2020

(51) Int. Cl.
| | |
|---|---|
| *H04N 19/196* | (2014.01) |
| *H04N 19/176* | (2014.01) |
| *H04N 19/186* | (2014.01) |
| *H04N 19/132* | (2014.01) |

(52) U.S. Cl.
CPC ......... *H04N 19/186* (2014.11); *H04N 19/132* (2014.11); *H04N 19/176* (2014.11); *H04N 19/197* (2014.11)

(58) Field of Classification Search
CPC .................................................. H04N 19/186
See application file for complete search history.

(56) References Cited

U.S. PATENT DOCUMENTS

| | | | |
|---|---|---|---|
| 6,618,500 B1 * | 9/2003 | Dawson ............... | G06T 11/001 345/604 |
| 9,544,607 B2 * | 1/2017 | Lai ....................... | H04N 19/176 |
| 9,860,560 B2 * | 1/2018 | Pu ......................... | H04N 19/176 |
| 9,906,799 B2 | 2/2018 | Zou et al. | |
| 10,097,842 B2 | 10/2018 | Seregin et al. | |
| 10,097,848 B2 | 10/2018 | Chuang et al. | |
| 10,382,749 B2 | 8/2019 | Seregin et al. | |
| 10,491,907 B2 * | 11/2019 | Laroche ............... | H04N 19/593 |

(Continued)

OTHER PUBLICATIONS

Y.C. Sun, S.T. Hsiang, J. Kim, Y.W. Chen, X. Xu, W. Zhu, & S.M. Lei, "Improvements of HEVC SCC Palette Mode and Intra Block Copy", 6 IEEE J. on Emerging & Selected Topics in Circuits & Systems 433-445 (Dec. 2016) (Year: 2016).*

(Continued)

*Primary Examiner* — David N Werner
(74) *Attorney, Agent, or Firm* — Lee & Hayes, P.C.

(57) ABSTRACT

Systems and methods are provided for improving efficiency of an encoder performance in the HEVC palette mode by limiting the number of colors to be used in the current palette to be no more than the size of coding unit or the prediction unit, and by avoiding duplicate colors in the current palette. The encoder may signal a binary vector indicating previous elements from a palette predictor list to be reused in a current palette, determine a number of the previous elements based on the binary vector, determine a sample size of the current palette, determine a maximum number of new elements to be used in the current palette based on the number of the previous elements and the sample size, determine a set of new elements corresponding to the maximum number of new elements, and signal the set of new elements.

15 Claims, 8 Drawing Sheets

(56) References Cited

U.S. PATENT DOCUMENTS

| | | | | |
|---|---|---|---|---|
| 2002/0097411 | A1* | 7/2002 | Roche | H04N 19/17 358/1.9 |
| 2004/0017393 | A1* | 1/2004 | Easwar | G06F 16/51 715/744 |
| 2010/0046628 | A1 | 2/2010 | Bhaskaran et al. | |
| 2015/0264365 | A1* | 9/2015 | Tsai | H04N 19/93 375/240.03 |
| 2015/0341655 | A1* | 11/2015 | Joshi | H04N 19/70 375/240.16 |
| 2015/0341656 | A1* | 11/2015 | Seregin | H04N 19/157 375/240.12 |
| 2015/0341660 | A1* | 11/2015 | Joshi | H04N 19/463 375/240.03 |
| 2015/0341673 | A1 | 11/2015 | Joshi et al. | |
| 2015/0341674 | A1* | 11/2015 | Seregin | H04N 19/186 375/240.12 |
| 2015/0365671 | A1* | 12/2015 | Pu | H04N 19/186 375/240.03 |
| 2015/0373325 | A1* | 12/2015 | Karczewicz | H04N 19/503 375/240.13 |
| 2016/0014407 | A1* | 1/2016 | Pu | H04N 19/176 375/240.16 |
| 2016/0057447 | A1* | 2/2016 | Pu | H04N 19/186 375/240.12 |
| 2016/0100176 | A1* | 4/2016 | Pu | H04N 19/593 375/240.01 |
| 2016/0100177 | A1* | 4/2016 | Pu | H04N 19/93 375/240.24 |
| 2016/0100184 | A1* | 4/2016 | Liu | H04N 19/176 382/166 |
| 2016/0100189 | A1* | 4/2016 | Pang | H04N 19/176 375/240.13 |
| 2016/0227254 | A1* | 8/2016 | Karczewicz | H04N 19/117 |
| 2016/0234494 | A1* | 8/2016 | Seregin | H04N 19/93 |
| 2016/0309183 | A1* | 10/2016 | Sun | H04N 19/186 |
| 2016/0323584 | A1* | 11/2016 | Chuang | H04N 19/48 |
| 2016/0323591 | A1* | 11/2016 | Chuang | H04N 19/105 |
| 2017/0078683 | A1* | 3/2017 | Seregin | H04N 19/463 |
| 2017/0085891 | A1* | 3/2017 | Seregin | H04N 19/186 |
| 2017/0099490 | A1 | 4/2017 | Seregin et al. | |
| 2017/0127058 | A1 | 5/2017 | Misra et al. | |
| 2017/0127077 | A1* | 5/2017 | Chuang | H04N 19/70 |
| 2017/0195676 | A1 | 7/2017 | Chuang et al. | |
| 2017/0238001 | A1* | 8/2017 | Li | H04N 19/96 375/240.12 |
| 2017/0310992 | A1* | 10/2017 | Lee | G06T 11/001 |
| 2017/0318302 | A1* | 11/2017 | Ye | H04N 19/70 |
| 2017/0374372 | A1* | 12/2017 | Liu | H04N 19/70 |
| 2018/0014034 | A1* | 1/2018 | Lai | H04N 19/593 |
| 2018/0020237 | A1* | 1/2018 | Lee | H04N 19/593 |
| 2018/0098093 | A1* | 4/2018 | Ye | H04N 19/70 |
| 2018/0109798 | A1* | 4/2018 | Lee | H04N 19/70 |
| 2018/0152714 | A1* | 5/2018 | Sun | H04N 19/70 |
| 2019/0222854 | A1* | 7/2019 | Keinert | H04N 19/176 |
| 2019/0281311 | A1* | 9/2019 | Ye | H04N 19/82 |
| 2020/0077122 | A1* | 3/2020 | Alakuijala | H04N 19/105 |
| 2020/0092546 | A1* | 3/2020 | Ye | H04N 19/105 |

OTHER PUBLICATIONS

Y.C. Sun, T.D. Chuang, P.L. Lai, Y.W. Chen, S. Liu, Y.W. Huang, & S. Lei, "Palette Mode—A New Coding Tool in Screen Content Coding Extensions of HEVC", 2015 IEEE Int'l Conf. on Image Processing 2409-2413 (Sep. 2015) (Year: 2015).*

W. Zhu, O.C. Au, W. Dai, H. Yang, R. Ma, L. Jia, J. Zeng, & P. Wan, "Palette-based Compound Image Compression in HEVC by Exploiting Non-Local Spatial Correlation", 2014 IEEE Int'l Conf. on Acoustic, Speech, & Signal Processing 7348-7352 (May 2014) (Year: 2014).*

X. Xiu, Y. He, R. Joshi, M. Karczewicz, P. Onno, C. Gisguet & G. Laroche, "Palette-based Coding in the Screen Content Coding Extension of the HEVC Standard", 2015 Data Compression Conference 253-262 (Apr. 2015) (Year: 2015).*

W. Pu, M. Karczewicz, R. Joshi, V. Seregin, F. Zou, J. Sole, Y.C. Sun, T.Z. Chuang, P. Lai, S. Liu, S.T. Hsiang, J. Ye, & Y.W. Huang, "Palette Mode Coding in HEVC Screen Content Coding Extension", 6 IEEE J. on Emerging & Selected Topics in Circuits & Systems 420-432 (Dec. 2016) (Year: 2016).*

Bross et al., "High Efficiency Video Coding (HEVC) text specification draft 9," ITU-T/ISO/IEC Joint Collaborative Team on Video Coding (JCT-VC), 11th Meeting: Shanghai, CN Oct. 10-19, 2012, 316 pages.

Joshi et al., "High Efficiency Video Coding (HEVC) Screen Content Coding: Draft 1," in Document of Joint Collaborative Team on Video Coding, JCTVC-R1005, 18th Meeting, Sapporo, JP, Jun. 30-Jul. 9, 2014, 358 pages.

Pu et al., "Palette Mode Coding in HEVC Screen Content Coding Extension," IEEE Journal on Emerging and Selected Topics in Circuits and Systems 6.4, Dec. 2016, pp. 420-432.

Wiegand et al., "Draft ITU-T Recommendation and Final Draft International Standard of Joint Video Specification (ITU-T Rec. H.264 |ISO/IEC 14496-10 AVC)," Joint Video Team (JVT) of ISO/IEC MPEG and ITU-T VCEG JVT-G050,8th Meeting: Geneva, Switzerland, May 23-27, 2003, 260 pages.

* cited by examiner

PALETTE SIZE CONSTRAINT IN PALETTE MODE FOR VIDEO COMPRESSION SYSTEM

BACKGROUND

The state-of-the-art video coding standard, such as H.264/AVC (Advanced Video Coding), H.264/MPEG-4 AVC, and H.265/HEVC (High Efficiency Video Coding) standard, is based on a hybrid coding scheme using block-based prediction and transform coding. To compress a video frame, a video compression system applies prediction methods, such as intra-prediction or inter-prediction, to derive a prediction frame. Based on the prediction frame, the video compression system further encodes residual information to refine the prediction frame. The residual information is usually compressed by transform and quantization techniques. Based on those information, a decoder is able to reconstruct the video frame from the prediction frame and the residual information. The decoder combines a prediction block and a residual block to generate a reconstructed block by simply adding prediction pixel values and residual pixel values to generate final reconstructed pixel values.

A new coding tool, palette mode, is adopted to standardize Screen Content Coding Extensions of High Efficiency Video Coding (HEVC SCC). The palette mode can efficiently describe all pixels in a coding unit (CU) with few selected representative colors. The palette mode is designed based on the observation that the pixel values in a screen content frame are usually concentrated on few color values. An encoder analyzes the pixels in a CU and determines several representative colors to construct a palette table, i.e., a color mapping table between the representative color values and color indices. The palette table is signaled in a bitstream. Pixels with pixel values close to palette colors are quantized to selected palette colors denoted by corresponding palette indices. The rest of the pixels are called escape pixels. A special palette index value is reserved to represent the escape pixels, and pixel values of the escape pixels are signaled directly. All palette indices in the CU form a palette index map, which is transmitted to a decoder along with the escape pixel values. A pixel or a palette index may represent a single color or three-color component values, for example, YCbCr or GBR.

In an HEVC syntax design for the HEVC palette mode, the palette may contain redundant colors, which may increase decoder implementation complexities, i.e., an encoder may signal some colors in the palette but may never use them.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to improving video compression system performance in the HEVC palette mode, and more specifically to improving efficiency of an encoder performance by limiting the number of colors to be used in the current palette to be no more than the size of coding unit or the prediction unit, and by avoiding duplicate colors in the current palette.

Figure 1:
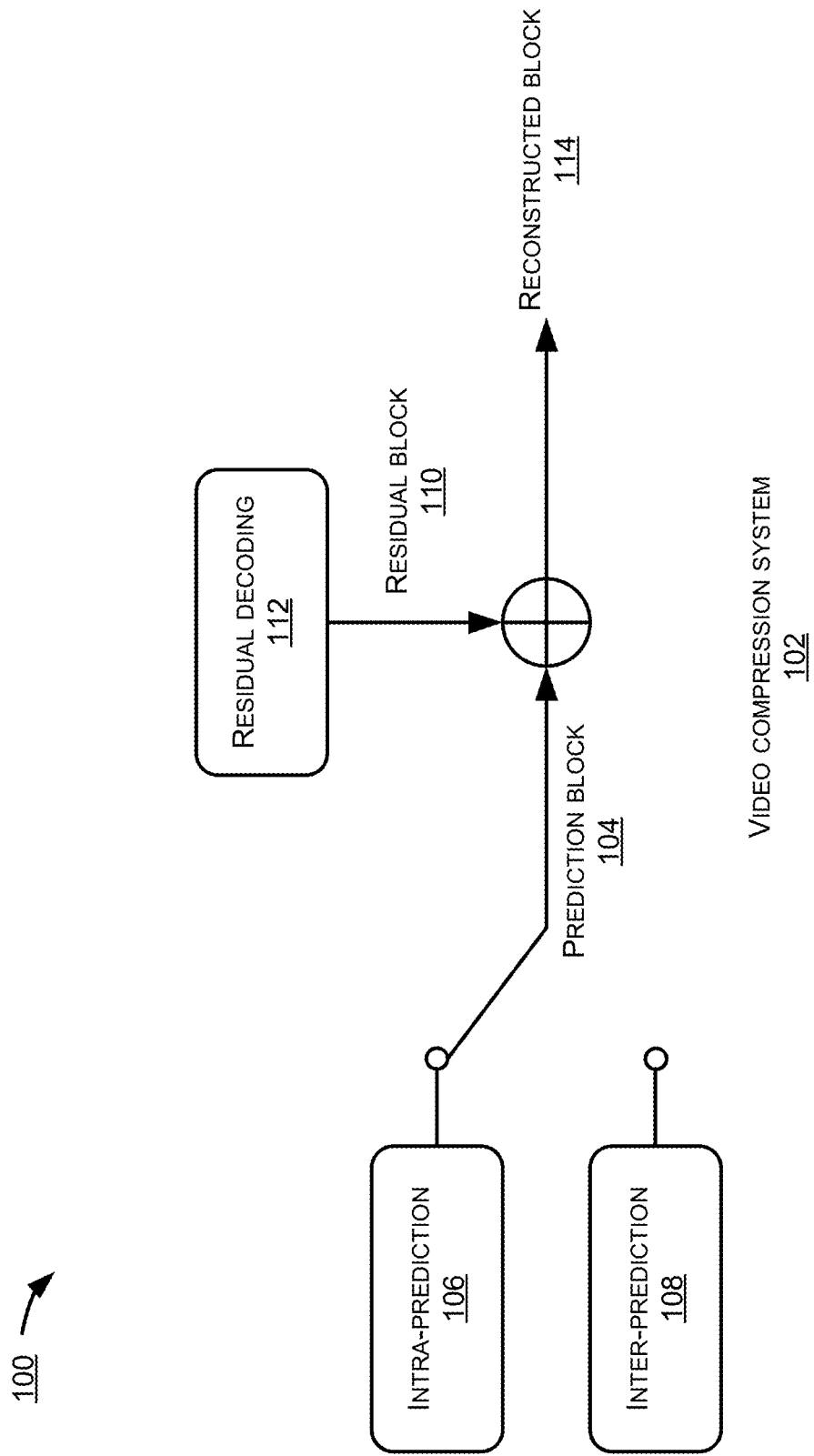
FIG. 1 illustrates an example decoding process of a video compression system using prediction methods.

FIG. 1 illustrates an example decoding process 100 of a video compression system 102 using prediction methods.

The video compression system 102 first derives a prediction block 104 by applying a prediction method, such as intra-prediction 106 or inter-prediction 108, and then decodes a residual block 110 by applying a residual decoding method 112. The video compression system 102 combines the prediction block 104 and the residual block 110 to generate a reconstructed block 114.

Figure 2:
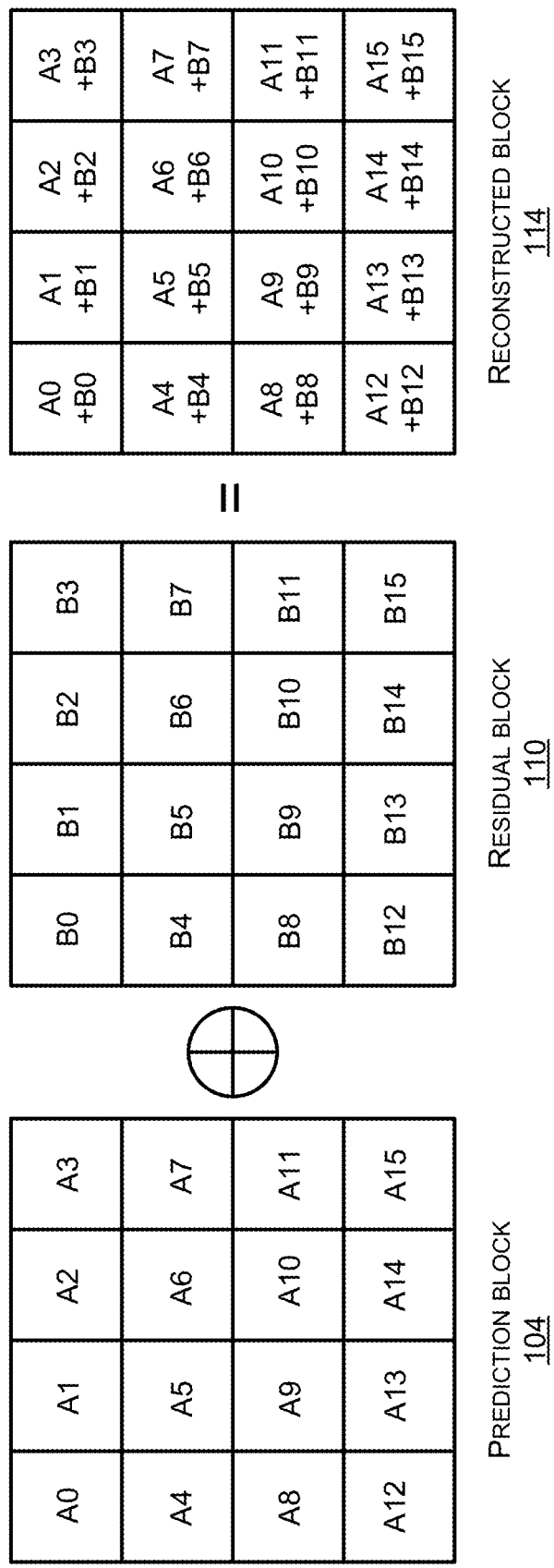
FIG. 2 illustrates an example prediction block, an example residual block, and an example reconstructed block derived by the video compression system of FIG. 1.

FIG. 2 illustrates example prediction block 104, residual block 110, and reconstructed block 114 derived by the video compression system 102 of FIG. 1.

The prediction block 104 and the residual block 110 are illustrated with the pixel values of coding units (CUs). As discussed above with reference to FIG. 1, the corresponding pixel values of the prediction block 104 and the residual block 110 are simply added to generate corresponding pixel values of the reconstructed block 114.

Figure 3:
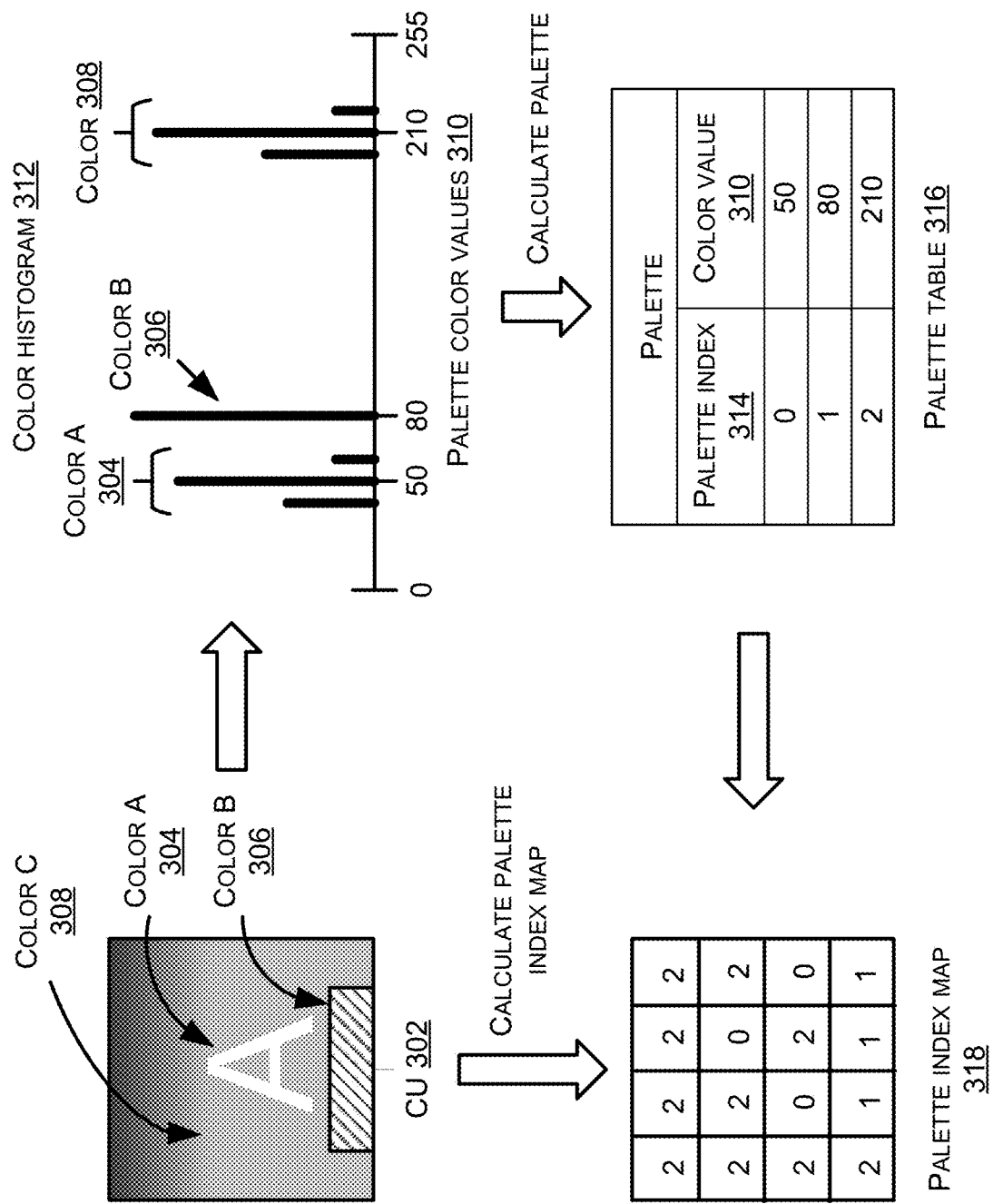
FIG. 3 illustrates an example diagram of the palette mode applied to an image.

FIG. 3 illustrates an example diagram 300 of the palette mode applied to CU 302. For simplicity, a pixel or a palette index is shown to correspond to only one value. However, in HEVC SCC, a pixel or a palette index may represent three color component values, such as YCbCr or GBR.

In the HEVC SCC palette mode, a flag is transmitted for each CU to indicate whether the palette mode is used for that CU, such as a CU 302. If the palette mode is used for the CU 302, the pixels, having pixel values close to palette colors, such as color A 304, color B 306, and color C 308, are represented by the palette color values 310 as shown in a color histogram 312. For example, the color A 304 is shown to be close to the palette color value of 50, the color B 306 is shown to be close to the palette color value of 80, and the color C 308 is shown to be close to the palette color value of 310. The palette color values 310 of the CU 302 are denoted by palette indices 314, where the palette color values 310 are representative colors of the CU 302 as shown in a palette table 316. The remaining pixels are presented by a special palette index value, denoted as an escape index, and their pixel values are signaled directly. Note that a color is a 3-value, for example, YCbCr or GBR, vector. Palette indices of all pixels in the CU 302 form a palette index map 318.

Figure 4:
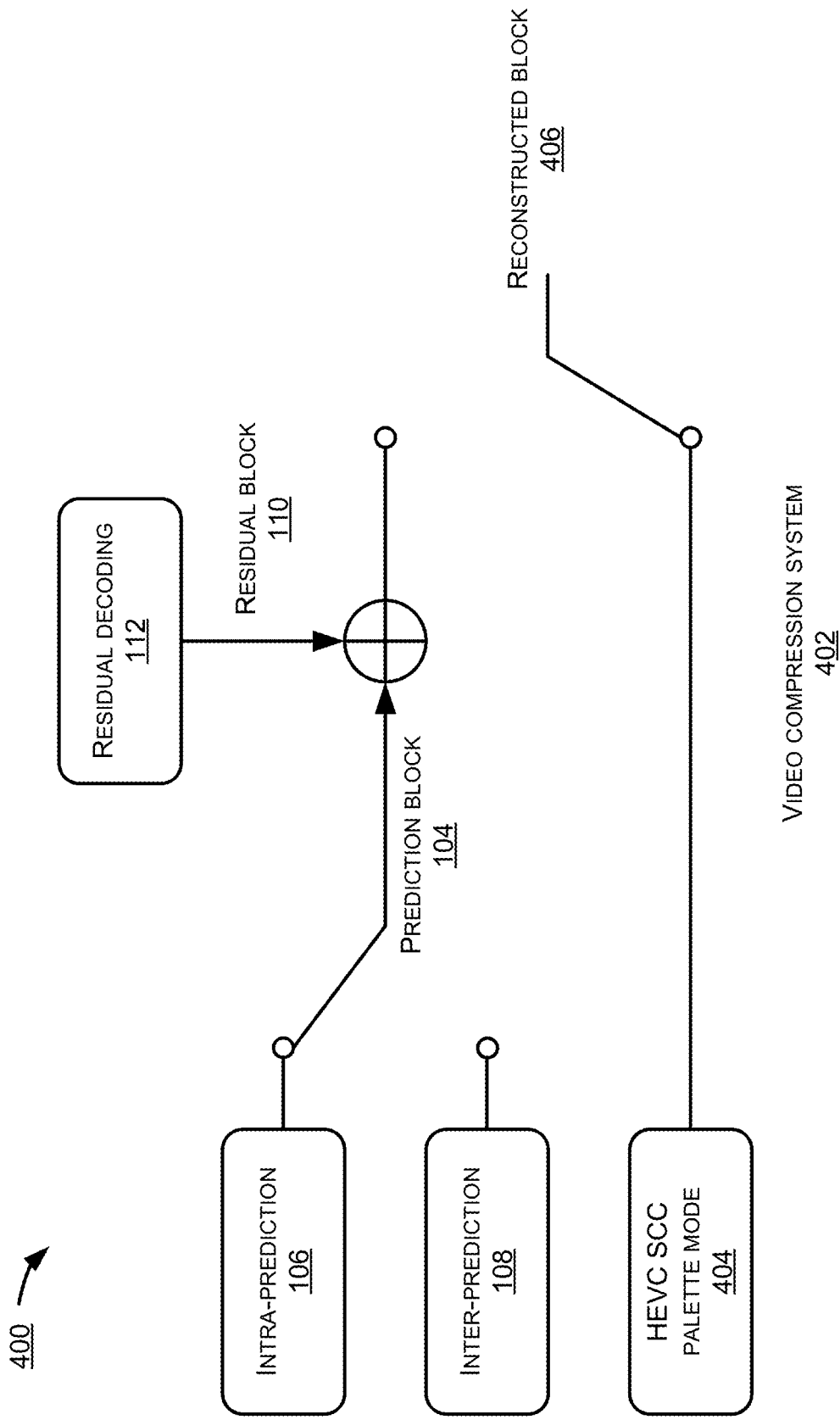
FIG. 4 illustrates an example decoding process of the video compression system using HEVC SCC palette mode.

FIG. 4 illustrates an example decoding process 400 of the video compression system 402 using HEVC SCC palette mode.

Compared to the intra/inter-prediction methods described with reference to FIG. 1, if a block, or a CU, is encoded by the HEVC SCC palette mode 404, it is decoded independently to generate a reconstructed block 406 without using any prediction method or residual refinement. To decode a palette encoded block, a video decoder of the video compression system 402 decodes palette colors and indices. Palette colors are described by a palette table, such as the palette table 316, and encoded by palette table coding tools. Based on the palette table, a pixel of three color components is represented by a palette index, such as the palette index 314. Palette indices of all pixels in the CU form a palette index map, such as the palette index map 318, and are encoded by palette index map coding tools.

Figure 5:
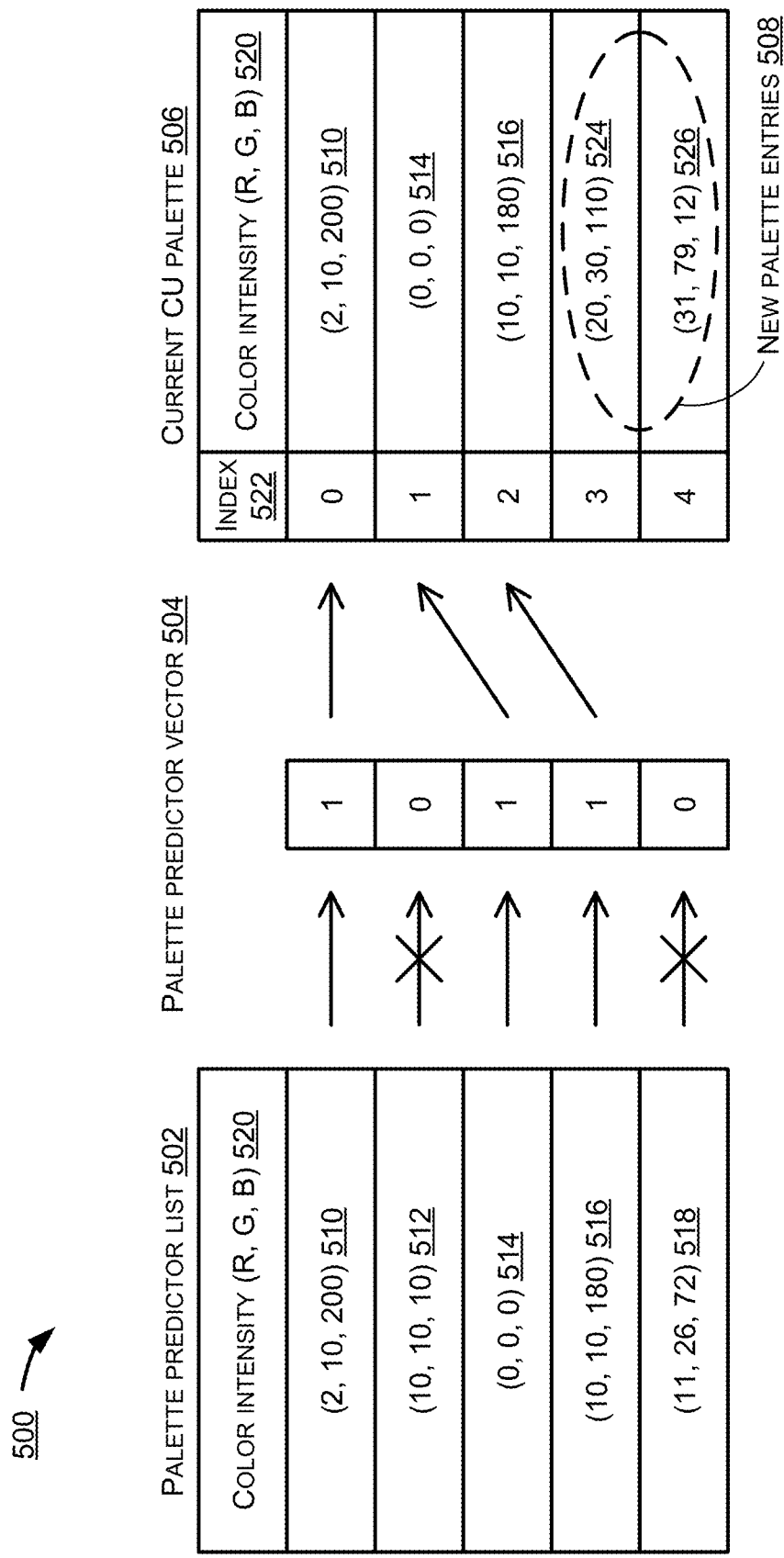
FIG. 5 illustrates an example pictorial representation of a palette predictor list having a binary vector applied and forming a current CU palette.

FIG. 5 illustrates an example pictorial representation 500 of a palette predictor list 502 having a binary vector, such as a palette predictor vector 504, applied and forming a palette for a current CU (current CU palette 506).

To reconstruct a palette, a palette predictor list, such as the palette predictor list 502, may store previously coded palette entries as references to predict a palette for a current CU, such as the current CU palette 506. To code the current CU palette 506 using the palette predictor list 502 as a reference, a binary vector, such as the binary vector 504, may be used to indicate whether each entry in the palette predictor list 502 is to be reused in the current CU palette 506. The reused entries may be placed at the beginning of the palette for the current CU 506, maintaining their order in the palette predictor list 502. This process may be followed by new palette entries 508 that are not present in the palette predictor list 502. In this example, there are five entries, 510, 512, 514, 516, and 518 as illustrated under color intensity (R, G, B) 520 in the palette predictor list 502 before coding the current CU. First, the binary vector 504 having a value '10110' is signaled, indicating that the first, third, and fourth elements, 510, 514, and 516, respectively, in the palette predictor list 502, are to be reused in the current CU palette 506. These three elements are placed at the beginning of the current palette, indexed as 0, 1, and 2, respectively under index 522 in the current CU palette 506. In the example, the current CU palette 506 has two more entries (index 3 and 4) which are not predicted from the palette predictor list 502. These two entries, 524 and 526, may be transmitted directly using a fixed length code.

Figure 6:
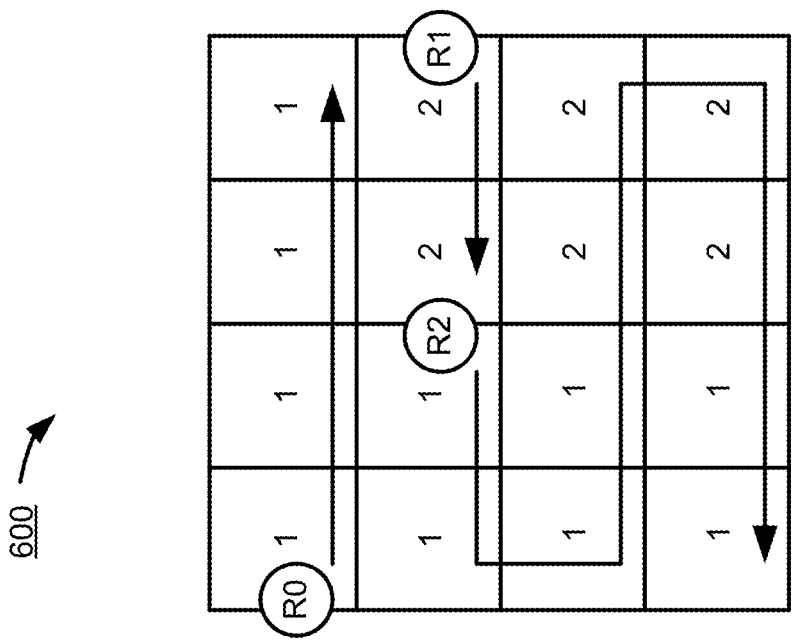
FIG. 6 illustrates an example palette index map coding.

FIG. 6 illustrates an example palette index map coding 600.

Referring back to FIGS. 3-5, the video compression system 402 constructs a palette table predictor to predict a palette table, such as the palette table 316 and the current CU palette 506, of the current CU by applying predictive coding where the palette of the last palette coded CU is used as the predictor. After the palette table 316, or the current CU palette 506, is encoded, the pixels in the current CU are represented by palette indices 602 corresponding to the colors in the palette as shown in a parameter table 604 along with other parameters of the palette index map coding. The indices form a palette index map 606 which is divided into several runs and then encoded in horizontal or vertical traverse scan order. In this example, the horizontal scan order is assumed, and the direction of the scan is shown as arrows in the palette index map 606. In the palette index map 606, 16 indices are encoded by run indices 608, three runs R0, R1, and R2, with horizontal traverse scan. There are two run modes 610, copy index mode and copy above mode, and for each starting position of a run, a flag is transmitted to indicate which run mode is used.

If the copy above mode is used, a run of pixels 612 will copy the palette indices from their above pixels. In this example, a run, R2, is a copy above run with a run value of 10. If the copy index mode is used, a palette_index_idc syntax element is first signaled, followed by a piece of PaletteIndexRun information. The palette_index_idc syntax describes whether the run is copy index mode (palette_index_idc=0) or copy above mode (palette_index_idc=1), and the PaletteIndexRun syntax describes the length of the run. A run of pixels 612 shares the same palette index 502, where the palette index 602 and the run value of the run of pixels 612 are derived from the palette_index_idc and PaletteIndexRun, respectively.

In an HEVC syntax design, the palette table 316 or the current CU palette 506 may contain redundant colors, that is, an encoder may signal colors in the palette table 316 or the current CU palette 506 but may never use some of the colors signaled. For example, if all CUs in a coding tree unit (CTU) were 4-by-4 size CUs, then there would be 16 samples for each CU and 16 colors at most in the palette for a CU. Having to create a buffer to store those unused colors signaled, for example, by an evil bitstream for each CU, may unnecessarily increase decoder implementation complexities.

Figure 7:
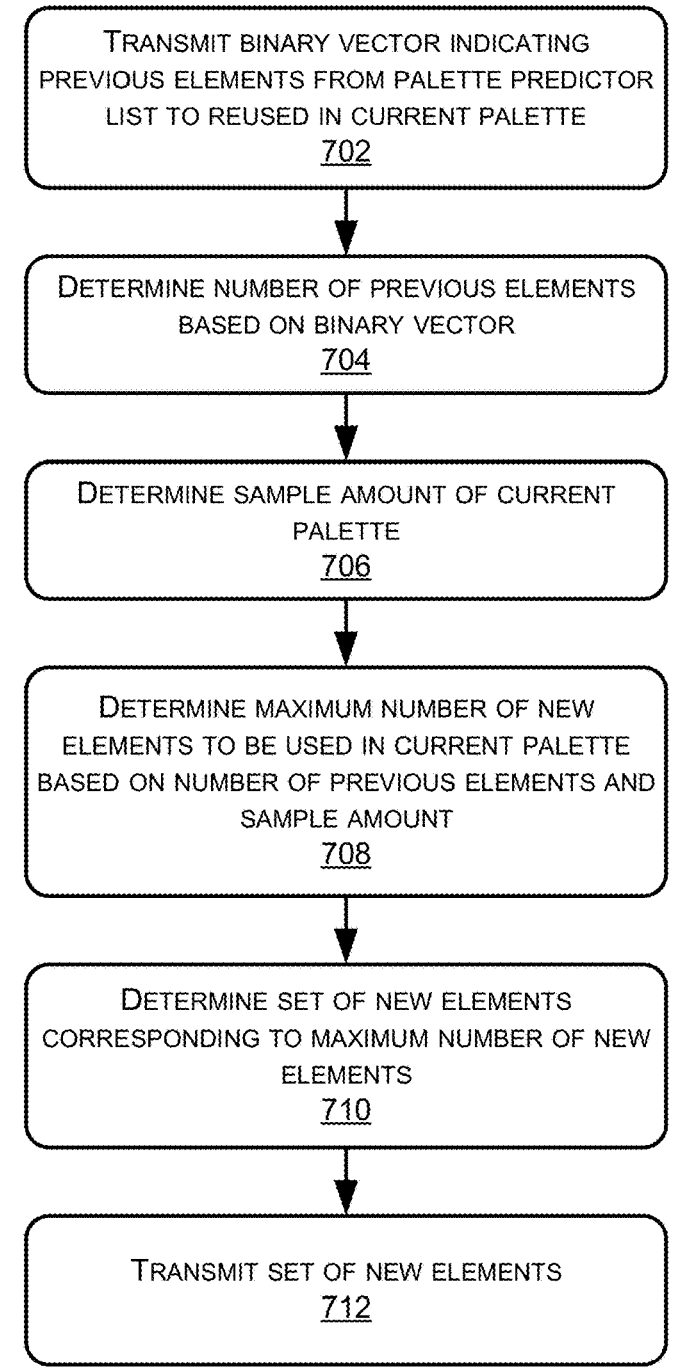
FIG. 7 illustrates an example flowchart for improving encoding efficiency by avoiding redundant and unused colors.

FIG. 7 illustrates an example flowchart 700 for improving encoding efficiency by avoiding redundant and unused colors. The process described below may be performed by a video encoder, or more specifically, by one or more processors of the video encoder. By avoiding redundant and unused colors that will not be used in the current palette, the video encoder may improve encoding efficiency by refraining from performing unnecessary quantization of colors which will not be used.

At block 702, a binary vector, such as the palette predictor vector 504 having a value 10110, may be signaled, or transmitted, indicating previous elements, such as 510, 514, and 516, from a palette predictor list, such as 502, to be reused in a current palette, such as the current CU palette 506. A number of the previous elements to be reused may be determined based on the binary vector at block 704. The value of the binary vector may vary from all 0s to all 1s. For example, the palette predictor vector 504 may have a value ranging from 00000, indicating that no color is reused, to 11111, indicating that all colors are reused. At block 706, a sample amount of the current palette may be determined. The sample amount of the current palette may include a size of a coding unit for the current palette and a size of a prediction unit for the current palette. The coding unit size and the prediction unit size may be 4×4, 8×8, or any other size used in the HEVC standard.

At block 708, a maximum number of new elements to be used in the current palette may be determined based on the number of the previous elements and the sample amount. For example, if the sample amount of the current palette were the size of a 4×4 CU, then there should be a maximum of 16 colors, or elements, for this palette. Therefore, the maximum number of the new elements is less than or equal to the sample amount of the current palette. The maximum number of the new elements may be determined by determining a difference between the sample amount and the number of the previous elements and setting the difference as the maximum number of the new elements.

In addition to the previous elements, the current palette may include escape pixels and reconstructed samples by intra prediction, which may require revising the maximum number of the new elements described above. To address this variation, a total number of escape pixels and reconstructed samples to be used in the current palette may be determined and the maximum number of new elements may be reduced by the total number. The reduced maximum number of new elements may then be set as the maximum number of new elements.

By setting the number of the new colors to be used in the current palette to the maximum usable number, the efficiency of the encoder may be improved due to avoiding buffering, or processing, for example quantizing, unnecessary or unused new colors.

Alternatively, because the new elements used in the current palette may be encoded using a code such as an exponential-Golomb code, an encoding parameter for encoding the new elements may be set such that a number of the encoded new elements is equal to the maximum number of new elements.

At block 710, a set of new elements corresponding to the maximum number of new elements may be determined. The elements of the set of new elements may be different from the previous elements, and the escape pixels and the reconstructed samples associated with the total number. Thus, the video encoder may avoid buffering, or processing, duplicate colors and may improve efficiency of the video encoder performance. The set of new elements may then be signaled, or transmitted, at block 712.

Figure 8:
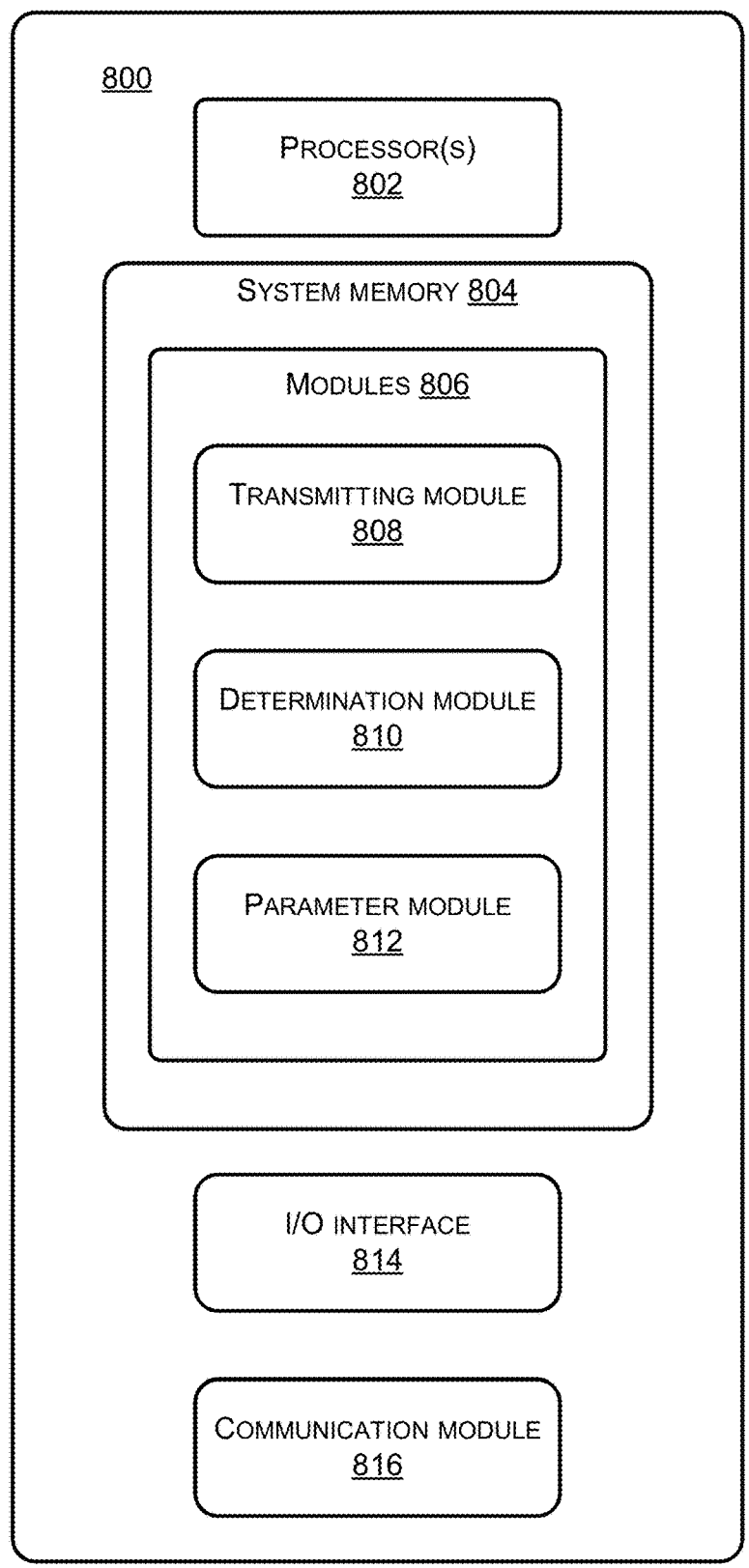
FIG. 8 illustrates an example system for implementing the processes and methods for improving encoding efficiency by avoiding redundant and unused colors.

FIG. 8 illustrates an example system 800 for implementing the processes and methods described above for improving encoding efficiency by avoiding redundant and unused colors.

The techniques and mechanisms described herein may be implemented by multiple instances of the system 800 as well as by any other computing device, system, and/or environment. The system 800 shown in FIG. 8 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 800 may include one or more processors 802 and system memory 804 communicatively coupled to the processor(s) 802. The processor(s) 802 may execute one or more modules and/or processes to cause the processor(s) 802 to perform a variety of functions. In some embodiments, the processor(s) 802 may include a central processing unit (CPU), a graphics processing unit (GPU), both CPU and GPU, or other processing units or components known in the art. Additionally, each of the processor(s) 802 may possess its own local memory, which also may store program modules, program data, and/or one or more operating systems.

Depending on the exact configuration and type of the system 800, the system memory 804 may be volatile, such as RAM, non-volatile, such as ROM, flash memory, miniature hard drive, memory card, and the like, or some combination thereof. The system memory 804 may include one or more computer-executable modules (modules) 806 that are executable by the processor(s) 802.

The modules 806 may include, but are not limited to, a transmitting module 808, a determination module 810, and a parameter module 812. The transmitting module 808 may be configured to transmit, or signal, a binary vector indicative of previous elements from a palette predictor list to be reused in a current palette as described with reference to FIG. 7.

The determination module 810 may be configured to determine a number of the previous elements based on the binary vector, a sample size for the current palette, a maximum number of the new elements to be used in the current palette based on the number of the previous elements and the sample size, and a set of new elements corresponding to the maximum number of new elements as described above with reference to FIG. 7. The sample size for the current palette may include a size of a coding unit for the current palette and a size of a prediction unit for the current palette. The coding unit size and the prediction unit size may be 4×4, 8×8, or any other size used in the HEVC standard.

The determination module 810 may determine the maximum number of new elements to be used in the current palette may be determined based on the number of the previous elements and the sample size. For example, if the sample size of the current palette were the size of a 4×4 CU, then there should be a maximum of 16 colors, or elements, for this palette. Therefore, the maximum number of the new elements is less than or equal to the sample size of the current palette. The maximum number of the new elements may be determined by determining a difference between the sample size and the number of the previous elements and setting the difference as the maximum number of the new elements.

In addition to the previous elements, the current palette may include escape pixels and reconstructed samples by intra prediction, which may require revising the maximum number of the new elements described above. To address this variation, the determination module 810 may determine a total number of escape pixels and reconstructed samples to be used in the current palette and reduce the maximum number of new elements by the total number. The determination module 810 may set the reduced maximum number of new elements as the maximum number of new elements.

By setting the number of the new colors to be used in the current palette to the maximum usable number, the efficiency of the encoder, such as the system 800, may be improved due to avoiding buffering, or processing, for example quantizing, unnecessary or unused new colors.

Alternatively, because the new elements used in the current palette may be encoded using a code such as an exponential-Golomb code, the parameter module 812 may set an encoding parameter for encoding the new elements such that a number of the encoded new elements is equal to the maximum number of new elements as described above with reference to FIG. 7.

The determination module 810 may determine a set of new elements corresponding to the maximum number of new elements. The set of new elements may be different from the previous elements, and the escape pixels and the reconstructed samples associated with the total number. Thus, the system 800, such as a video encoder, may avoid buffering, or processing, duplicate colors and may improve efficiency of the video encoder performance.

The transmitting module 808 may be further configured to transmit, or signal, the set of new elements.

The system 800 may additionally include an input/output (I/O) interface 814 for receiving data associated with binary vector, the palette predictor list, new elements, and the sample size of the current palette. The system 800 may also include a communication module 816 allowing the system 800 to communicate with other devices (not shown) over a network (not shown). The network may include the Internet, wired media such as a wired network or direct-wired connections, and wireless media such as acoustic, radio frequency (RF), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-8. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

A. A method in a video encoder comprising: determining a sample amount of a current palette; determining a maximum number of new elements to be used in the current palette based on the sample amount; determining a set of new elements corresponding to the maximum number of new elements; and transmitting the set of new elements.

B. The method as paragraph A recites, wherein the sample amount of the current palette includes a size of a coding unit for the current palette and a size of a prediction unit for the current palette, and the maximum number of new elements is less than or equal to the sample amount of the current palette.

C. The method as paragraph A recites, further comprising: determining a number of previous elements from a palette predictor list to be reused in the current palette based on a binary vector.

D. The method as paragraph C recites, wherein determining the maximum number of new elements to be used in the current palette based on the sample amount includes: determining the maximum number of new elements to be used in the current palette based on the sample amount and the number of previous elements to be reused in the current palette.

E. The method as paragraph D recites, wherein determining the maximum number of new elements includes: determining a difference between the sample amount and the number of the previous elements to be reused; and setting the difference as the maximum number of new elements.

F. The method as paragraph E recites, further comprising, prior to determining the set of new elements: determining a total number of escape pixels and reconstructed samples to be used in the current palette; reducing the maximum number of new elements by the total number; and setting the reduced maximum number as the maximum number of new elements.

G. The method as paragraph F recites, wherein the set of new elements is different from the previous elements, and escape pixels and reconstructed samples associated with the total number.

H. The method as paragraph F recites, further comprising: setting an encoding parameter for encoding the new elements such that a number of the encoded new elements is equal to the maximum number of new elements.

I. A computer-readable storage medium storing computer-readable instructions executable by one or more processors of a video encoder, that when executed by the one or more processors, cause the one or more processors to perform operations comprising: determining a number of previous elements from a palette predictor list to be reused in a current palette based on a binary vector; determining a sample amount of the current palette; determining a maximum number of new elements to be used in the current palette based on the number of the previous elements and the sample amount; determining a set of new elements corresponding to the maximum number of new elements; and transmitting the set of new elements.

J. The computer-readable storage medium as paragraph I recites, wherein sample amount for the current palette includes a size of a coding unit for the current palette and a size of a prediction unit for the current palette, and the maximum number of new elements is less than or equal to the sample amount of the current palette.

K. The computer-readable storage medium as paragraph I recites, wherein determining the maximum number of new elements includes: determining a difference between the sample amount and the number of the previous elements to be reused; and setting the difference as the maximum number of new elements.

L. The computer-readable storage medium as paragraph K recites, wherein the operations further comprise, prior to determining the set of new elements: determining a total number of escape pixels and reconstructed samples to be used in the current palette; reducing the maximum number of new elements by the total number; and setting the reduced maximum number as the maximum number of new elements.

M. The computer-readable storage medium as paragraph L recites, wherein the set of new elements is different from: the previous elements, and escape pixels and reconstructed samples associated with the total number.

N. The computer-readable storage medium as paragraph L recites, wherein the operations further comprise: setting an encoding parameter for encoding the new elements such that a number of the encoded new elements is equal to the maximum number of new elements.

O. A system for a video encoder comprising: one or more processors; and memory communicatively coupled to the one or more processors, the memory storing computer-executable modules executable by the one or more processors that, when executed by the one or more processors, perform associated operations, the computer-executable modules including: a determination module configured to determine: a number of previous elements from a palette predictor list to be reused in a current palette based on a binary vector, a sample amount for the current palette, a maximum number of new elements to be used in the current palette based on the sample amount, and a set of new elements corresponding to the maximum number of new elements; and a transmitting module is configured to transmit the set of new elements.

P. The system as paragraph O recites, wherein the sample amount of the current palette includes a size of a coding unit for the current palette and a size of a prediction unit for the current palette, and the maximum number of new elements is less than or equal to the sample amount of the current palette.

Q. The system as paragraph O recites, wherein the determination module is further configured to determine the maximum number of new elements by: determining a difference between the sample amount and the number of the previous elements to be reused, and setting the difference as the maximum number of new elements.

R. The system as paragraph Q recites, wherein the determination module is further configured to, prior to determining the set of new elements: determine a total number of escape pixels and reconstructed samples to be used in the current palette; reduce the maximum number of new elements by the total number; and set the reduced maximum number as the maximum number of new elements.

S. The system as paragraph R recites, wherein the set of new elements is different from: the previous elements, and escape pixels and reconstructed samples associated with the total number.

T. The system of as paragraph R recites, wherein the computer-executable modules further include: a parameter module configured to set an encoding parameter for encoding the new elements such that a number of the encoded new elements is equal to the maximum number of new elements.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method in a video encoder comprising:
   determining a sample amount of a current palette;
   determining a number of previous elements from a palette predictor list to be reused in the current palette based on a binary vector;
   determining a difference between the sample amount and the number of the previous elements to be reused;
   setting the difference as a maximum number of new elements to be used in the current palette;
   determining a set of new elements corresponding to the maximum number of new elements; and
   transmitting the set of new elements.

2. The method of claim 1, wherein:
   the sample amount of the current palette includes a size of a coding unit for the current palette and a size of a prediction unit for the current palette, and
   the maximum number of new elements is less than or equal to the sample amount of the current palette.

3. The method of claim 1, further comprising, prior to determining the set of new elements:
   determining a total number of escape pixels and reconstructed samples to be used in the current palette;
   reducing the maximum number of new elements by the total number; and
   setting the reduced maximum number as the maximum number of new elements.

4. The method of claim 3, wherein the set of new elements is different from:
   the previous elements, and
   escape pixels and reconstructed samples associated with the total number.

5. The method of claim 3, further comprising:
   setting an encoding parameter for encoding the new elements such that a number of the encoded new elements is equal to the maximum number of new elements.

6. A computer-readable storage medium storing computer-readable instructions executable by one or more processors of a video encoder, that when executed by the one or more processors, cause the one or more processors to perform operations comprising:
   determining a number of previous elements from a palette predictor list to be reused in a current palette based on a binary vector;
   determining a sample amount of the current palette;
   determining a difference between the sample amount and the number of the previous elements to be reused;
   setting the difference as a maximum number of new elements to be used in the current palette;
   determining a set of new elements corresponding to the maximum number of new elements; and
   transmitting the set of new elements.

7. The computer-readable storage medium of claim 6, wherein:
   the sample amount of the current palette includes a size of a coding unit for the current palette and a size of a prediction unit for the current palette, and
   the maximum number of new elements is less than or equal to the sample amount of the current palette.

8. The computer-readable storage medium of claim 6, wherein the operations further comprise, prior to determining the set of new elements:

determining a total number of escape pixels and reconstructed samples to be used in the current palette;

reducing the maximum number of new elements by the total number; and setting the reduced maximum number as the maximum number of new elements.

9. The computer-readable storage medium of claim 8, wherein the set of new elements is different from:

the previous elements, and escape pixels and reconstructed samples associated with the total number.

10. The computer-readable storage medium of claim 8, wherein the operations further comprise:

setting an encoding parameter for encoding the new elements such that a number of the encoded new elements is equal to the maximum number of new elements.

11. A system for a video encoder comprising:

one or more processors; and memory communicatively coupled to the one or more processors, the memory storing computer-executable modules executable by the one or more processors that, when executed by the one or more processors, perform associated operations, the computer-executable modules including:

a determination module configured to determine:

a number of previous elements from a palette predictor list to be reused in a current palette based on a binary vector, a sample amount of a current palette, a maximum number of new elements to be used in the current palette based on the sample amount by:

determining a difference between the sample amount and the number of the previous elements to be reused, and setting the difference as the maximum number of new elements, and a set of new elements corresponding to the maximum number of new elements; and a transmitting module configured to transmit the set of new elements.

12. The system of claim 11, wherein:

the sample amount of the current palette includes a size of a coding unit for the current palette and a size of a prediction unit for the current palette, and the maximum number of new elements is less than or equal to the sample amount of the current palette.

13. The system of claim 11, wherein the determination module is further configured to, prior to determining the set of new elements:

determine a total number of escape pixels and reconstructed samples to be used in the current palette;

reduce the maximum number of new elements by the total number; and set the reduced maximum number as the maximum number of new elements.

14. The system of claim 13, wherein the set of new elements is different from:

the previous elements, and escape pixels and reconstructed samples associated with the total number.

15. The system of claim 13, wherein the computer-executable modules further include:

a parameter module configured to set an encoding parameter for encoding the new elements such that a number of the encoded new elements is equal to the maximum number of new elements.

* * * * *